US012571499B2

(12) United States Patent (10) Patent No.: US 12,571,499 B2

McClure (45) Date of Patent: Mar. 10, 2026

(54) CONTAINMENT DEVICE TO HOUSE AN OIL WICKING PROCESS TO PROTECT, CLEAN OR LUBRICATE ANY METALLIC ITEM OR TOOL

(71) Applicant: Bryan McClure, Hubert, NC (US)

(72) Inventor: Bryan McClure, Hubert, NC (US)

( * ) Notice: Subject to any disclaimer, the term of this patent is extended or adjusted under 35 U.S.C. 154(b) by 0 days.

(21) Appl. No.: 18/951,870

(22) Filed: Nov. 19, 2024

(65) Prior Publication Data

US 2025/0172241 A1 May 29, 2025

Related U.S. Application Data

(60) Provisional application No. 63/603,701, filed on Nov. 29, 2023.

(51) Int. Cl.
*F16N 7/12* (2006.01)
*F16N 19/00* (2006.01)

(52) U.S. Cl.
CPC .............. *F16N 7/12* (2013.01); *F16N 19/00* (2013.01)

(58) Field of Classification Search
CPC .................................... F16N 7/12; F16N 19/00
See application file for complete search history.

(56) References Cited

U.S. PATENT DOCUMENTS

| | | | | |
|---|---|---|---|---|
| 1,682,571 A | * | 8/1928 | Horan ..................... | A47G 21/14 224/233 |
| 2,262,753 A | * | 11/1941 | Brennan ................. | B65D 51/32 206/209 |

| | | | | |
|---|---|---|---|---|
| 3,642,998 A | * | 2/1972 | Jennings ................. | C23F 11/02 206/207 |
| 3,759,594 A | * | 9/1973 | Cobb ...................... | A45D 27/22 206/208 |
| 4,245,367 A | * | 1/1981 | Stoute ................... | G01F 23/045 15/218.1 |
| 5,363,957 A | * | 11/1994 | Reichner ............... | A47F 5/0006 206/349 |
| 5,628,971 A | * | 5/1997 | Norman .................... | A61L 2/26 422/301 |

(Continued)

FOREIGN PATENT DOCUMENTS

| | | | |
|---|---|---|---|
| CN | 203738495 | * | 7/2014 |
| CN | 207616540 | | 7/2018 |

OTHER PUBLICATIONS

International Search Authority, "International Search Report" and "Written Opinion", PCT/US2024/056459, mailed Jan. 17, 2025.

*Primary Examiner* — Anna M Momper
*Assistant Examiner* — Mark K Buse
(74) *Attorney, Agent, or Firm* — Jeffrey C. Watson, Esq.; Grell & Watson Patent Attorneys LLC

(57) ABSTRACT

A containment device to house an oil wicking process to protect, clean, and/or lubricate a metallic item or tool includes a containment housing with a wicking oil inside of the containment housing. At least one slot is positioned through the containment housing. Each of the at least one slots is configured to receive a working portion of the metallic item or tool. Wherein, when the working portion of the metallic item or tool is inserted into the slot, the working portion of the metallic item or tool is submerged into the wicking oil. Wherein, the wicking oil is configured to lubricate, protect or clean the working portion of the metallic item or tool.

20 Claims, 9 Drawing Sheets

(56)           References Cited

U.S. PATENT DOCUMENTS 5,743,359 A  *   4/1998  Parnell ...................... F16N 7/12
                                        184/88.1
6,041,919 A  *   3/2000  Adams ................. A45D 34/046
                                        220/736
2020/0094396 A1     3/2020  Steiner

* cited by examiner

CONTAINMENT DEVICE TO HOUSE AN OIL WICKING PROCESS TO PROTECT, CLEAN OR LUBRICATE ANY METALLIC ITEM OR TOOL

CROSS-REFERENCE TO RELATED APPLICATIONS

This application claims benefit to U.S. Provisional Patent Application No. 63/603,701 filed on Nov. 29, 2023, which is incorporated by reference in its entirety.

FIELD OF THE DISCLOSURE

The present disclosure is related to metallic items or tools requiring oil wicking to protect, clean and/or lubricate any parts thereof. More specifically, the present disclosure relates to a containment device to house an oil wicking process to protect, clean, and/or lubricate any metallic item or tool.

BACKGROUND

Generally speaking, wicking is simply fluid transfer by means of capillary action. Capillary action is the process through which liquid flows in a narrow, porous wicking media without the assistance of, or even in opposition to, external forces like gravity.

On metallic items or tools, like knives, plyers, wrenches, bits, the like, etc., the metallic item or tool may get dirty or rusty over time. Dirst or dust may collect on the metallic item or tool and may slow or impede the function of any moving parts on the metallic item or tool, like the opening of a pocket knife, the opening of pliers, the like, etc. In addition, rust may form when iron and oxygen react in the presence of water or moisture. This reaction creates a chemical compound known as iron oxide, or commonly referred to as rust. However, there are other factors that can contribute to rust formation on such metallic items or tools. Some of these factors include moisture, oxygen, salt, and/or acids. Moisture is one of the main factors that contribute to rust formation on metallic items or tools. When water is left on a metallic item or tool, it can start to break down the metal, leading to rust formation. Oxygen is another key factor in the rusting process. When oxygen reacts with iron, it forms iron oxide, which again is what we commonly refer to as rust. This is why metallic items or tools that are exposed to air are more likely to rust than those that are kept in an airtight container. Salt can also accelerate the rusting process by breaking down the protective layer on any metallic item or tool. This is why metallic items or tools, like knives that are used to cut food that is high in salt (such as cured meats or cheese), are more susceptible to rust. This is also why metallic items or tools, like knives or plyers used in and around salt water, like for fishing or working in or around beach properties, are more susceptible to rust. Acids, such as those found in citrus fruits or vinegar, can also cause rust on a knife or other metallic item or tool. When acid comes into contact with the metal, it can react with it and cause the metal to break down.

As discussed above, there are a number of unavoidable environmental factors that contribute to dirt, dust and/or rust building up on metallic items or tools that are really difficult to reduce or prevent. Therefore, a need clearly exists for a means and/or process for protecting, cleaning and/or maintaining metallic items or tools from dirt, dust and/or rust from any metallic items or tools. One known process for protecting, cleaning and/or maintaining metallic items and/or tools is to apply oil to the outer surface of the metallic item or tool, like on the blade of a knife. This oil applied onto the outer surface of the metallic item may be wicked into the outer surface and provide a layer of protection on the outer surface. Such oils may include, but are not limited to, mineral oils, machine oils, specialized knife oils, synthetic lubricants, 3 and 1 oils, gun oils, the like etc. The instant disclosure recognizes the problem with applying oil to the metallic item or tool is that the oil only lasts a certain amount of time and has to be reapplied at regular frequencies, which can depend on the use and the environmental factors the item or tool is exposed to.

Another known process for protecting, cleaning and/or maintaining metallic items and/or tools is storing them in containers or sheaths to protect the items from the outside environment. The problem with such storage is that even with the best of containers or sheaths, the metallic item or tool still gets exposed at least a little to the outside environment, especially when being taken out of the container or sheath for use. As an example, and clearly not limited thereto, all knife sheaths are made without the advantage of applying a lubricant to the blade. So, when the knives are placed back in the sheath, they begin to rust and damage the blade. This is true for any tool or metallic item being stored. The instant disclosure may be designed to lubricate, protect, and/or clean such knives, tools, or items to prevent rust or damage when it is placed back into a sheath for storage and/or transportation.

As such, there is clearly a need to provide a better means and/or method for protecting, cleaning and/or maintaining metallic items and/or tools. The instant disclosure may be designed to address at least certain aspects of the problems or needs discussed above by providing a containment device to house an oil wicking process to protect, clean, and/or lubricate any metallic item or tool.

SUMMARY

The present disclosure may solve the aforementioned limitations of the currently available means and mechanisms for protecting, cleaning, and/or lubricating metallic items or tools by providing a containment device to house an oil wicking process to protect, clean, or lubricate a metallic item or tool. The containment device disclosed herein may include a containment housing with a wicking oil inside of the containment housing. At least one slot may be included in the containment housing. Each of the at least one slots may be configured to receive a working portion of the metallic item or tool. Wherein, when the working portion of the metallic item or tool is inserted into the slot, the working portion of the metallic item or tool may be submerged into the wicking oil.

One feature of the disclosed containment device to house an oil wicking process to protect, clean, or lubricate a metallic item or tool may be that when the working portion of the metallic item or tool is inserted into the slot and the working portion of the metallic item or tool is submerged into the wicking oil, the wicking oil may be configured to lubricate, protect and/or clean the working portion of the metallic item or tool.

In select embodiments of the disclosed containment device to house an oil wicking process to protect, clean, or lubricate a metallic item or tool, the containment housing may include an open top side and a top. In these embodiments, the at least one slot may be positioned in the top of the containment housing. In select embodiments, the top may be configured to be removably attached to the open top side of the containment housing. Wherein the top may be removed from the containment housing for inserting or removing the wicking oil from the containment housing. The top may be configured to be sealed to the open top side of the containment housing for sealing the open top side of the containment housing. In select embodiments, the top may include a submerged inner surface. The submerged inner surface may be positioned below an upper edge surface of the open top side of the containment housing. The at least one slot may be positioned in the submerged inner surface of the top of the containment housing. Wherein, the submerged inner surface may be designed and configured to allow the containment housing to be partially filled with the wicking oil. In addition, the submerged inner surface may be designed and configured to allow any spills or excess of the wicking oil to be captured on the submerged inner surface and drained back into the containment housing through the at least one slot.

Another feature of the disclosed containment device to house an oil wicking process to protect, clean, or lubricate a metallic item or tool may be that each of the at least one slots may include a flexible inner opening. The flexible inner opening of each of the slots may be configured for engaging the metallic item or tool as it is being inserted into the slot and/or removed from the slot. Wherein, the flexible inner opening of each of the slots may be designed and configured to remove dirt and dust from the working portion of the metallic item or tool before it is inserted into the wicking oil in the containment housing. In addition, the flexible inner opening of each of the slots may be configured to remove excess of the wicking oil from the working portion of the metallic item or tool after it is removed from the wicking oil in the containment housing. In select embodiments, the flexible inner opening may be recessed into the slot for providing support around the metallic item or tool to keep the metallic item or tool positioned in the slot. In select embodiments, the flexible inner opening of each of the slots may be, but is not limited to, a rubber flexible inner opening, a fabric material flexible inner opening, or a brush material flexible inner opening.

Another feature of the disclosed containment device to house an oil wicking process to protect, clean, or lubricate a metallic item or tool may be that when the metallic item or tool is a knife, where the working portion of the knife is a blade, the at least one slot may be a knife slot. The knife slot may be sized and configured to receive the blade of the knife into the wicking oil in the containment housing. Wherein, when the knife is inserted into the containment device through the knife slot, the wicking oil may be wicked to the blade, like to stop any degradation of the blade of the knife.

Another feature of the disclosed containment device to house an oil wicking process to protect, clean, or lubricate a metallic item or tool may be that when the metallic item or tool is a pair of pliers, where the working portion of the pair of pliers is a pivot point and jaws, the at least one slot may be a pliers slot. The pliers slot may be sized and configured to receive the pivot point and jaws of the pair of pliers into the wicking oil in the containment housing. Wherein, when the pivot point and jaws of the pair of pliers is inserted into the containment device through the pliers slot, oil is wicked to the pivot point and jaws of the pair of pliers to lubricate the pair of pliers, like before being stored in a holder.

In select embodiments, the disclosed containment device to house an oil wicking process to protect, clean, or lubricate a metallic item or tool may include at least two of the slots. In these embodiments, at least one of the slots may be a knife slot and/or at least one of the slots may be a pliers slot. Each of the knife slots may be sized and configured to receive the blade of the knife into the wicking oil in the containment housing, wherein when the knife is inserted into the containment device through one of the knife slots, the wicking oil is wicked to the blade to stop any degradation. Each of the pliers slot may be sized and configured to receive a pivot point and jaws of a pair of pliers into the wicking oil in the containment housing, wherein when the pivot point and jaws of the pair of pliers is inserted into the containment device through one of the pliers slots, oil is wicked to the pivot point and jaws of the pair of pliers to lubricate the pair of pliers before being stored in a holder. In select embodiments, and clearly not limited thereto, the containment housing may include five or seven of the knife slots on a knife end portion of the containment housing, and four of the pliers slots on a pliers end portion of the containment housing.

In another aspect, the instant disclosure embraces the disclosed containment device to house an oil wicking process to protect, clean, or lubricate a metallic item or tool in any of the embodiments and/or combination of embodiments shown and/or described herein.

In another aspect, the instant disclosure embraces an oil wicking process to protect, clean, and/or lubricate a metallic item or tool. The disclosed oil wicking process to protect, clean, and/or lubricate a metallic item or tool may generally include utilizing the disclosed containment device to house an oil wicking process to protect, clean, or lubricate a metallic item or tool in any of the embodiments and/or combination of embodiments shown and/or described herein. As such, in select embodiments, the disclosed oil wicking process to protect, clean, and/or lubricate a metallic item or tool may generally include: providing the disclosed containment device to house an oil wicking process to protect, clean, or lubricate a metallic item or tool in any of the embodiments and/or combination of embodiments shown and/or described herein; inserting the working portion of the metallic item or tool into the slot; and submerging the working portion of the metallic item or tool into the wicking oil.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-9, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

Figure 1:
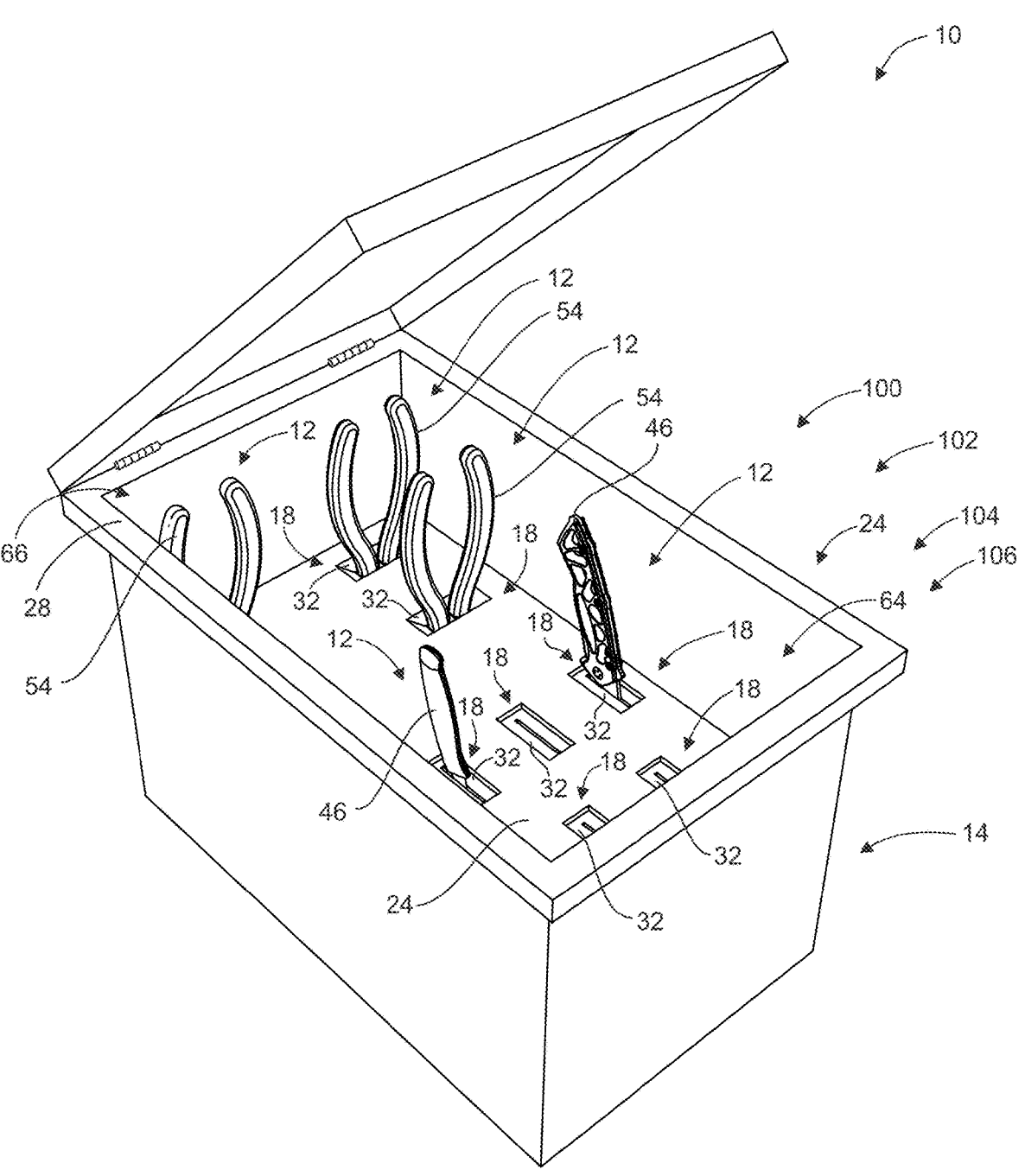
FIG. 1 is a top perspective view of a containment device to house an oil wicking process to protect, clean, and/or lubricate any metallic item or tool according to select embodiments of the instant disclosure.
Figure 2:
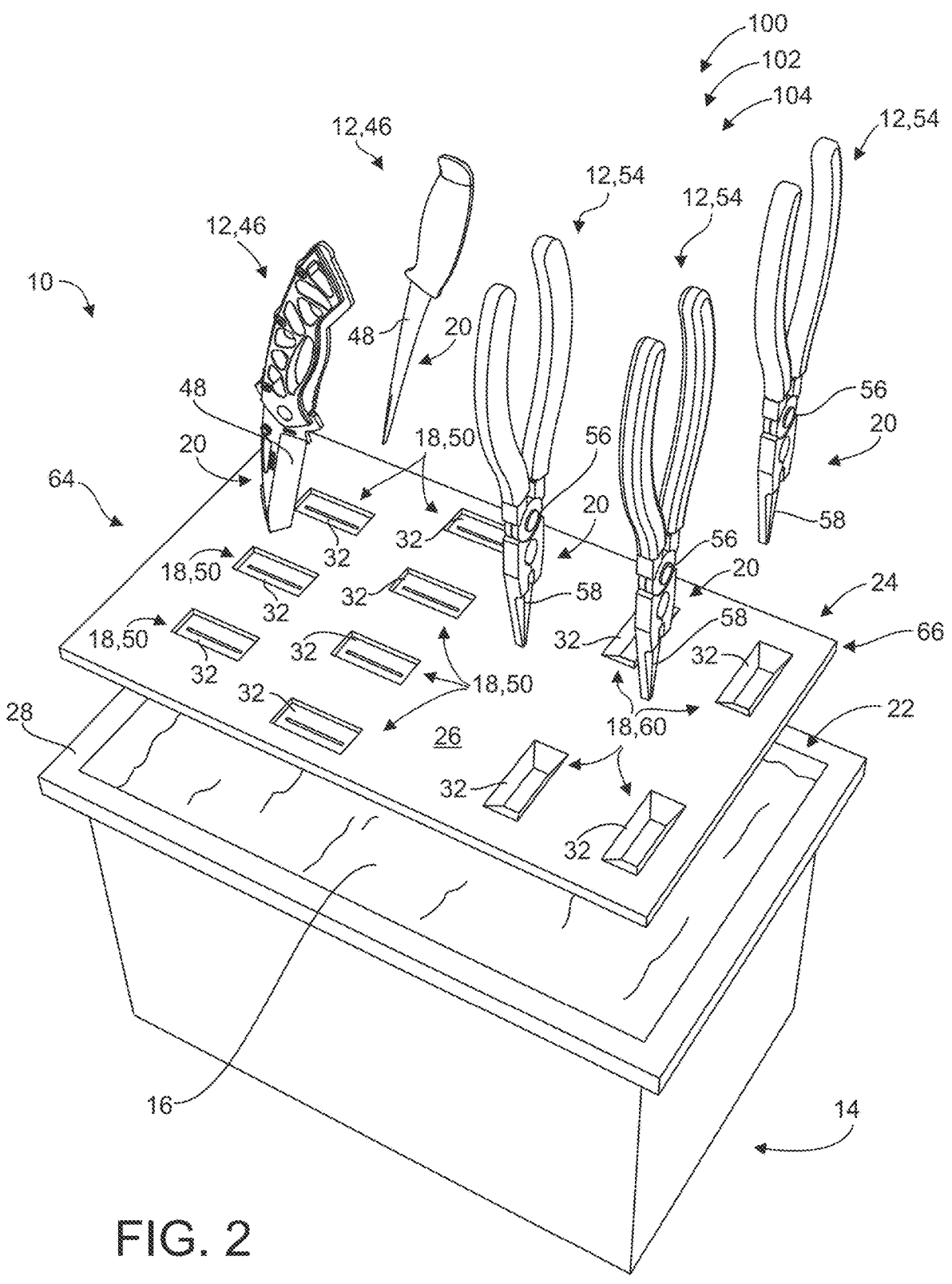
FIG. 2 is a partially disassembled top perspective view of the containment device of FIG. 1.
Figure 3:
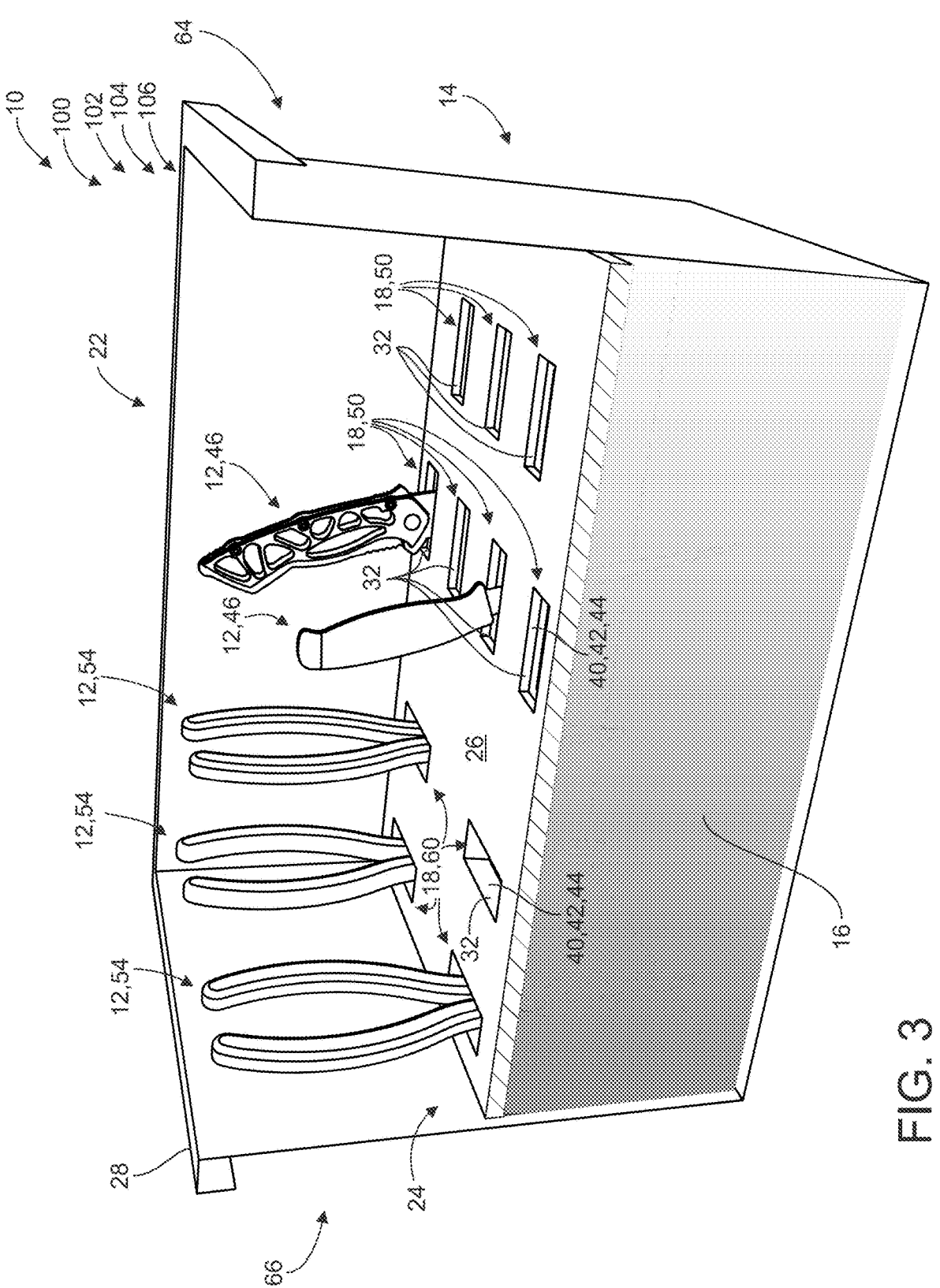
FIG. 3 is a cross-sectional view of the containment device of FIG. 1 with knives being inserted into the knife slots of the removable top and submerged into the wicking oil, and plyers being inserted into the plyers slots of the removable top and submerged into the wicking oil.
Figure 4:
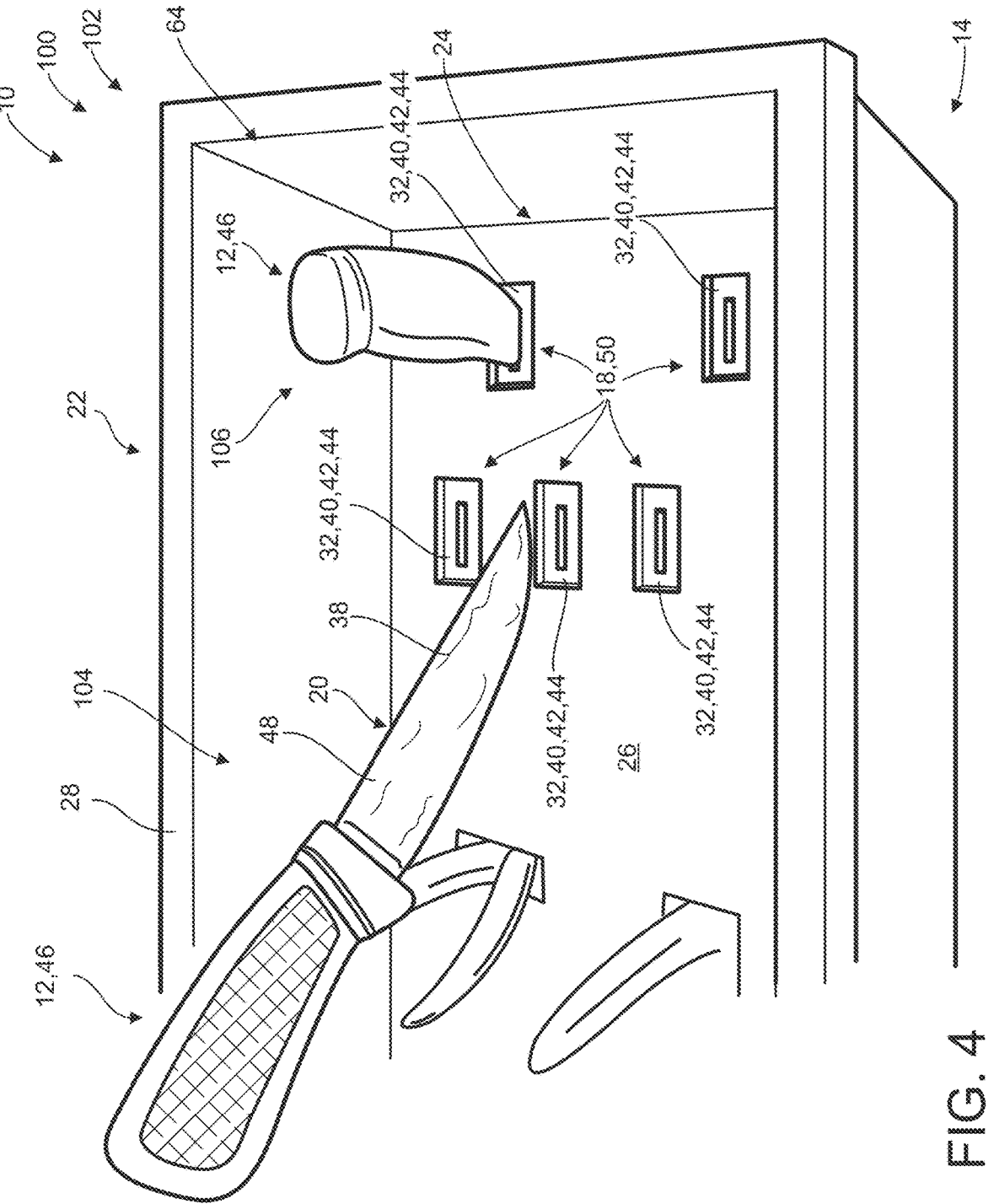
FIG. 4 is a partial top perspective view of the containment device of FIG. 1 with knives being inserted into the knife slots of the removable top.
Figure 5:
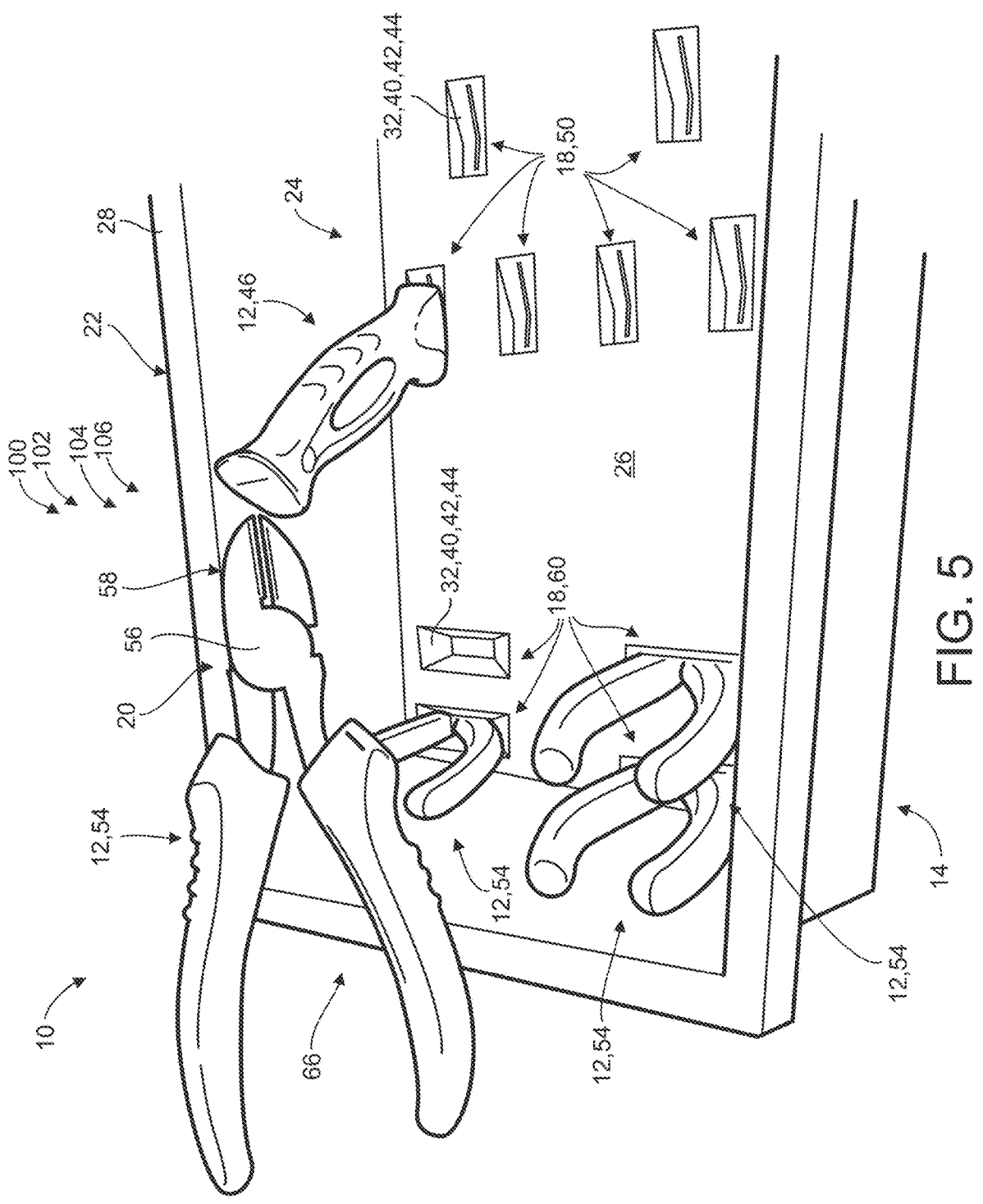
FIG. 5 is a partial top perspective view of the containment device of FIG. 1 with plyers being inserted into the plyer slots of the removable top.

The present disclosure may solve the aforementioned limitations of the currently available means and mechanisms for protecting, cleaning, and/or lubricating metallic items or tools by providing containment device 10 to house oil wicking process 100 to protect, clean, or lubricate metallic item or tool 12. Containment device 10 disclosed herein may generally include containment housing 14 with wicking oil 16 inside of containment housing 14. Containment housing 14 may be any size, shape or configuration of a vessel or container for holding wicking oil 16 including any desired amount of wicking oil 16. As an example, and clearly not limited thereto, containment housing 14 may be a plastic container, similar to a plastic tool box, for holding wicking oil 16 therein. As shown in FIG. 1, in select embodiments, containment housing 14 may include a hinged lid for closing the top of containment housing 14, similar to a tool box. In select embodiments, the hinged lid may include latches on the opposing sides of the hinges for securely closing the top of containment housing 14. In select embodiments, the hinged lid may also include a handle for aiding in carrying and transporting containment device 10. Wicking oil 16 used in containment device 10 may be any oil or similar device for cleaning, protecting and/or lubricating metallic item or tool 12. As examples, and clearly not limited thereto, wicking oil 16 may include, but is not limited to, being any mineral oils, machine oils, specialized knife oils, synthetic lubricants, 3 and 1 oils, gun oils, the like etc.

As shown in the Figures, at least one slot 18 may be included in containment housing 14. Each of the at least one slots 18 may be configured to receive working portion 20 of metallic item or tool 12. Each of the slots 18 may be designed, sized and configured to receive various sizes, shapes and/or configurations of metallic item or tool 12. When working portion 20 of metallic item or tool 12 is inserted into one of the slots 18, working portion 20 of metallic item or tool 12 may be submerged into wicking oil 16. This submersion of working portion 20 of metallic item or tool 12 may provide for oil wicking process 100 for cleaning, protecting and/or lubricating working portion 20 of metallic item or tool 12.

As such, one feature of containment device 10 to house oil wicking process 100 to protect, clean, or lubricate metallic item or tool 12 may be that when working portion 20 of metallic item or tool 12 is inserted into one of the slots 18 and working portion 20 of metallic item or tool 12 is submerged into wicking oil 16, wicking oil 16 may be configured to lubricate, protect and/or clean working portion 20 of metallic item or tool 12.

As best shown in FIGS. 1-5, in select embodiments of containment device 10 to house oil wicking process 100 to protect, clean, or lubricate a metallic item or tool 12, containment housing 14 may include open top side 22 and top 24. In these embodiments, the at least one slot 18 may be positioned in top 24 of containment housing 14. In select embodiments, top 24 may be configured to be removably attached to open top side 22 of containment housing 14, or in open top side 22 of containment housing 14. Wherein top 24 may be removed from containment housing 14 for inserting or removing wicking oil 16 from containment housing 14, like for filling containment housing 14 with wicking oil 16, or for draining and replacing wicking oil 16 in containment housing 14. Top 24 may be configured to be sealed to or in open top side 22 of containment housing 14 for sealing open top side 22 of containment housing 14. In select embodiments, as shown in the figures, top 24 may include submerged inner surface 26. Submerged inner surface 26 may be positioned below upper edge surface 28 of open top side 22 of containment housing 14. Each of the slots 18 may be positioned in submerged inner surface 26 of top 24 of containment housing 14. Wherein, submerged inner surface 26 may be designed and configured to allow containment housing 14 to be partially filled with wicking oil 16, where even with containment housing 14 only partially filled, working portions 20 of metallic item or tools 12 inserted through the slots 18 may still be submerged in wicking oil 16. In addition, submerged inner surface 26 may be designed and configured to allow any spills 30 or excess 38 of wicking oil 16 to be captured on submerged inner surface 26 and drained back into containment housing 14 through the slots 18.

Still referring to FIGS. 1-5, another feature of containment device 10 to house oil wicking process 100 to protect, clean, or lubricate metallic item or tool 12 may be that each of the at least one slots 18 may include flexible inner opening 32. Flexible inner opening 32 of each of the slots 18 may be configured for engaging metallic item or tool 12 as it is being inserted into one of the slot 18 and/or removed from one of the slots 18. Wherein, flexible inner opening 32 of each of the slots 18 may be designed and configured to remove dirt 34, dust 36, and/or rust 35 from working portion 20 of metallic item or tool 12 before it is inserted into wicking oil 16 in containment housing 14. In addition, flexible inner opening 32 of each of the slots 18 may be configured to remove excess 38 of wicking oil 16 from working portion 20 of metallic item or tool 12 after it is removed from wicking oil 16 in containment housing 14. In select embodiments, flexible inner opening 32 may be recessed into its respective slot 18 for providing support around metallic item or too 121 to help keep or aid metallic item or tool 12 positioned in slot 18. In select embodiments, flexible inner opening 32 of each of the slots 18 may be, but it not limited to, rubber flexible inner opening 40, fabric material flexible inner opening 42, and/or brush material flexible inner opening 44.

Referring to FIGS. 1-5 and 7-8, another feature of containment device 10 to house oil wicking process 100 to protect, clean, or lubricate metallic item or tool 12 may be that when metallic item or tool 12 is knife 46, where working portion 20 of knife 46 is blade 48, the at least one slot 18 may be knife slot 50. Each of the knife slots 50 may be sized and configured to receive blade 48 of knife 46 into wicking oil 16 in containment housing 14. Wherein, when knife 46 is inserted into containment device 10 through knife slot 50, wicking oil 16 may be wicked to blade 48, like to stop any degradation of blade 48 of knife 46, like before being stored/transported in knife sheath 52.

Referring to FIGS. 1-6 and 9, another feature of containment device 10 to house oil wicking process 100 to protect, clean, or lubricate metallic item or tool 12 may be that when metallic item or tool 12 is pair of pliers 54, where working portion 20 of pair of pliers 54 is pivot point 56 and jaws 58, the at least one slot 18 may be pliers slot 60. Each of the pliers slots 60 may be sized and configured to receive pivot point 56 and jaws 58 of pair of pliers 54 into wicking oil 16 in containment housing 14. Wherein, when pivot point 56 and jaws 58 of pair of pliers 54 is inserted into containment device 10 through one of the pliers slots 60, wicking oil 16 may be wicked to pivot point 56 and jaws 58 of pair of pliers 54 to lubricate pair of pliers 54, like before being stored/transported in pliers holder 62.

As shown in FIGS. 1-5, in select embodiments, containment device 10 to house oil wicking process 100 to protect, clean, or lubricate metallic item or tool 12 may include at least two of the slots 18. In these embodiments, at least one of the slots 18 may be knife slot 50 and/or at least one of the slots 18 may be pliers slot 60. Each of the knife slots 50 may be sized and configured to receive blade 48 of knife 46 into wicking oil 16 in containment housing 14, wherein when knife 46 is inserted into containment device 10 through one of the knife slots 50, wicking oil 16 is wicked to blade 48 to stop any degradation, like before being stored/transported in knife sheath 52. Each of the pliers slots 60 may be sized and configured to receive pivot point 56 and jaws 58 of pair of pliers 54 into wicking oil 16 in containment housing 14, wherein when pivot point 56 and jaws 58 of pair of pliers 54 is inserted into containment device 10 through one of the pliers slots 60, wicking oil 16 is configured to be wicked to pivot point 56 and jaws 58 of pair of pliers 54, like to lubricate pair of pliers 54 before being stored/transported in pliers holder 62. In select embodiments, and clearly not limited thereto, containment housing 14 may include five or seven of the knife slots 50 on knife end portion 64 of containment housing 14, and four of the pliers slots 60 on pliers end portion 66 of containment housing 14.

Figure 6A:
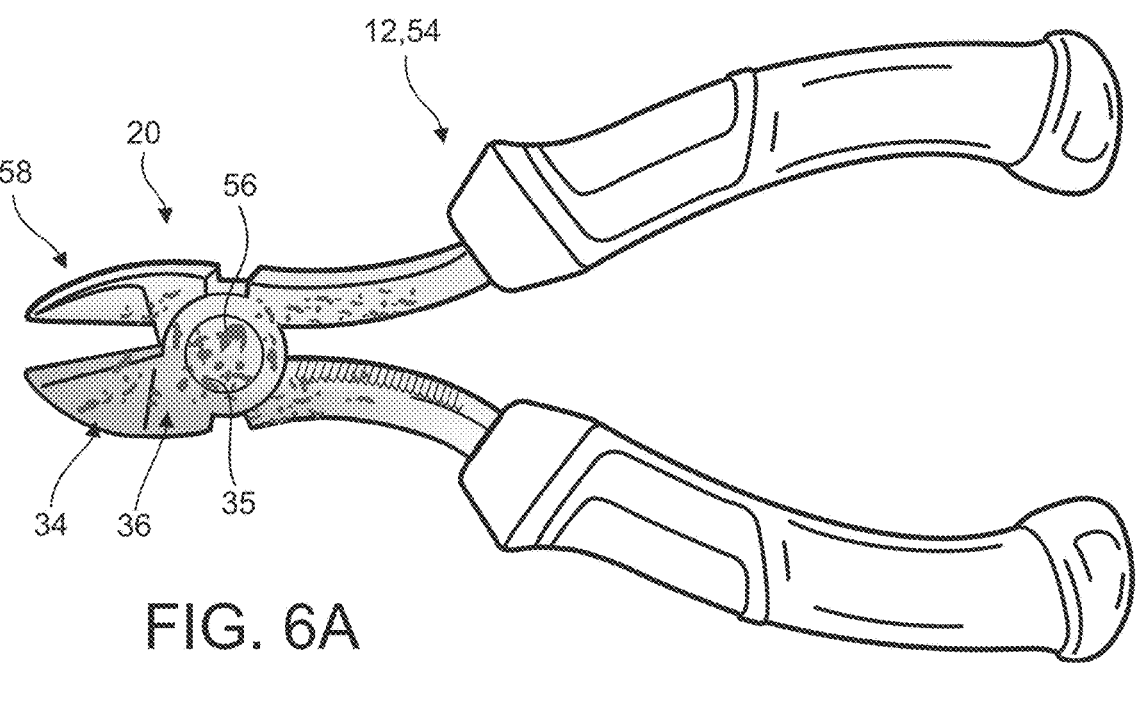
FIG. 6A is a perspective view of a pair of pliers prior to or without using the disclosed containment device to house an oil wicking process to protect, clean, and/or lubricate any metallic item or tool showing the dirt, dust and/or rust on the working portion of the pair of pliers including the pivot point and the jaws.
Figure 6B:
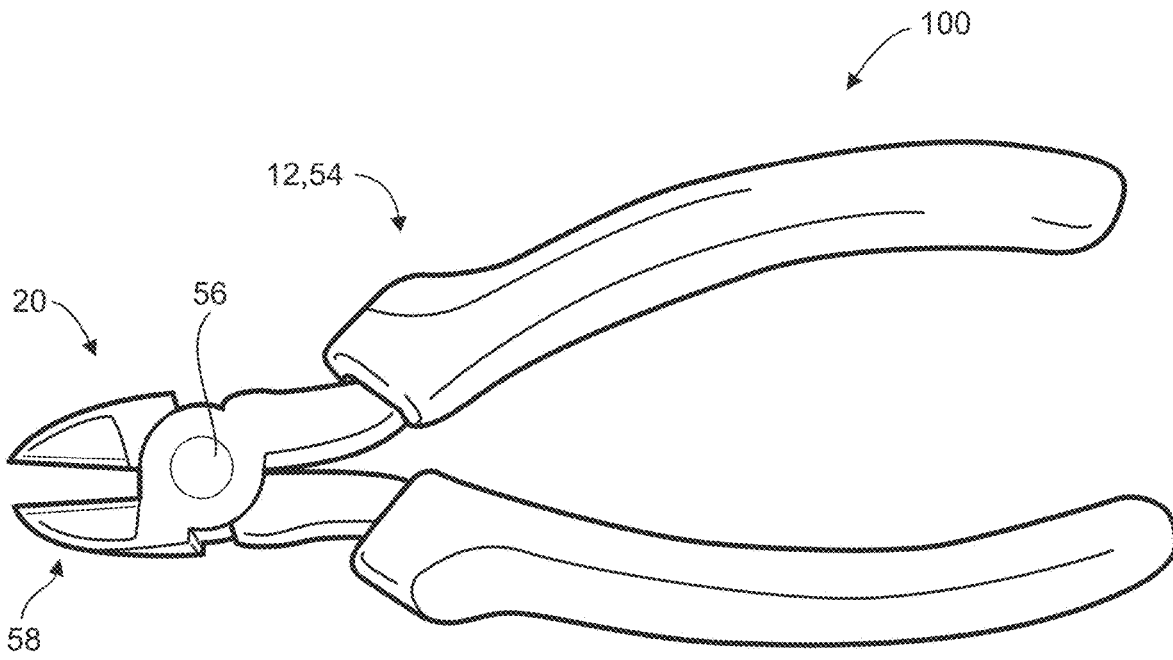
FIG. 6B is a perspective view of the pair of pliers of FIG. 6A after being wicked in the disclosed containment device to house an oil wicking process to protect, clean, and/or lubricate any metallic item or tool showing the dirt, dust and/or rust removed from the working portion of the pair of pliers including the pivot point and the jaws.

Referring specifically to FIGS. 6A and 6B, pair of pliers 54 is shown. In FIG. 6A, pair of pliers 54 is shown prior to or without using the disclosed containment device 10 to house oil wicking process. As shown, pair of pliers 54 includes dirt 34, dust 36 and/or rust 35 on working portion 20 of the pair of pliers 54 including pivot point 56 and/or jaws 58. In FIG. 6B of pliers 54 is shown after being wicked in the disclosed containment device 10 to house oil wicking process 100 showing dirt 34, dust 36 and/or rust 35 removed from working portion 20 of the pair of pliers 54 including being removed from pivot point 56 and jaws 58.

Figures 7A, 7B:
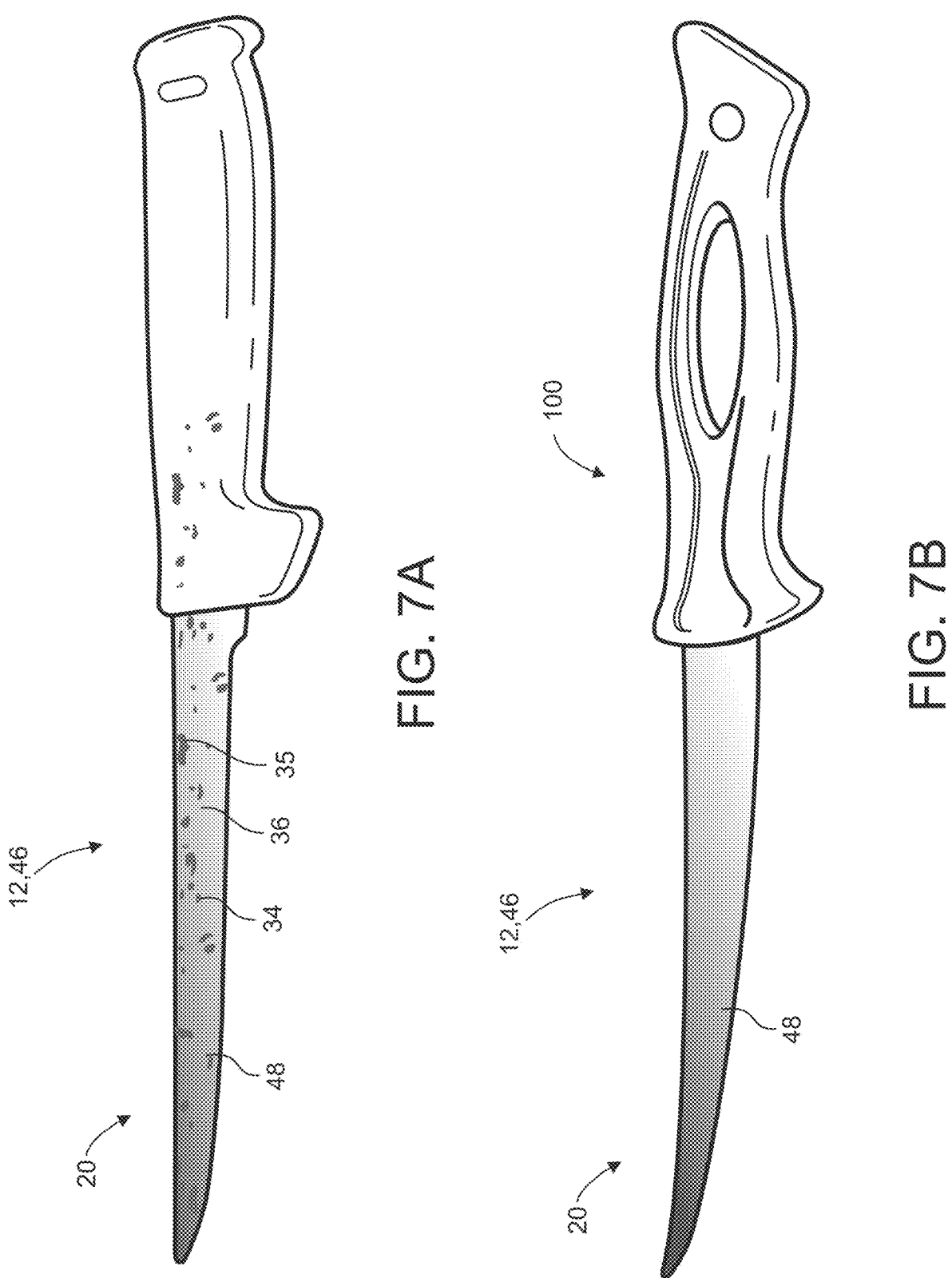
FIG. 7A is a perspective view of a knife prior to or without using the disclosed containment device to house an oil wicking process to protect, clean, and/or lubricate any metallic item or tool showing the dirt, dust and/or rust on the working portion of the knife including the blade of the knife.
FIG. 7B is a perspective view of the knife of FIG. 7A after being wicked in the disclosed containment device to house an oil wicking process to protect, clean, and/or lubricate any metallic item or tool showing the dirt, dust and/or rust removed from the working portion of the knife including the blade of the knife.

Referring specifically to FIGS. 7A and 7B, knife 46 is shown. In FIG. 7A knife 46 is shown prior to or without using the disclosed containment device 10 to house oil wicking process 100. As shown, knife 46 includes dirt 34, dust 36 and/or rust 35 on working portion 20 of knife 46 including on blade 48 of knife 46. In FIG. 7B, knife 46 is shown after being wicked in the disclosed containment device 10 to house oil wicking process showing the dirt 34, dust 36 and/or rust 35 removed from working portion 20 of knife 46 including being removed from blade 48 of knife 46.

Figures 8A, 8B:
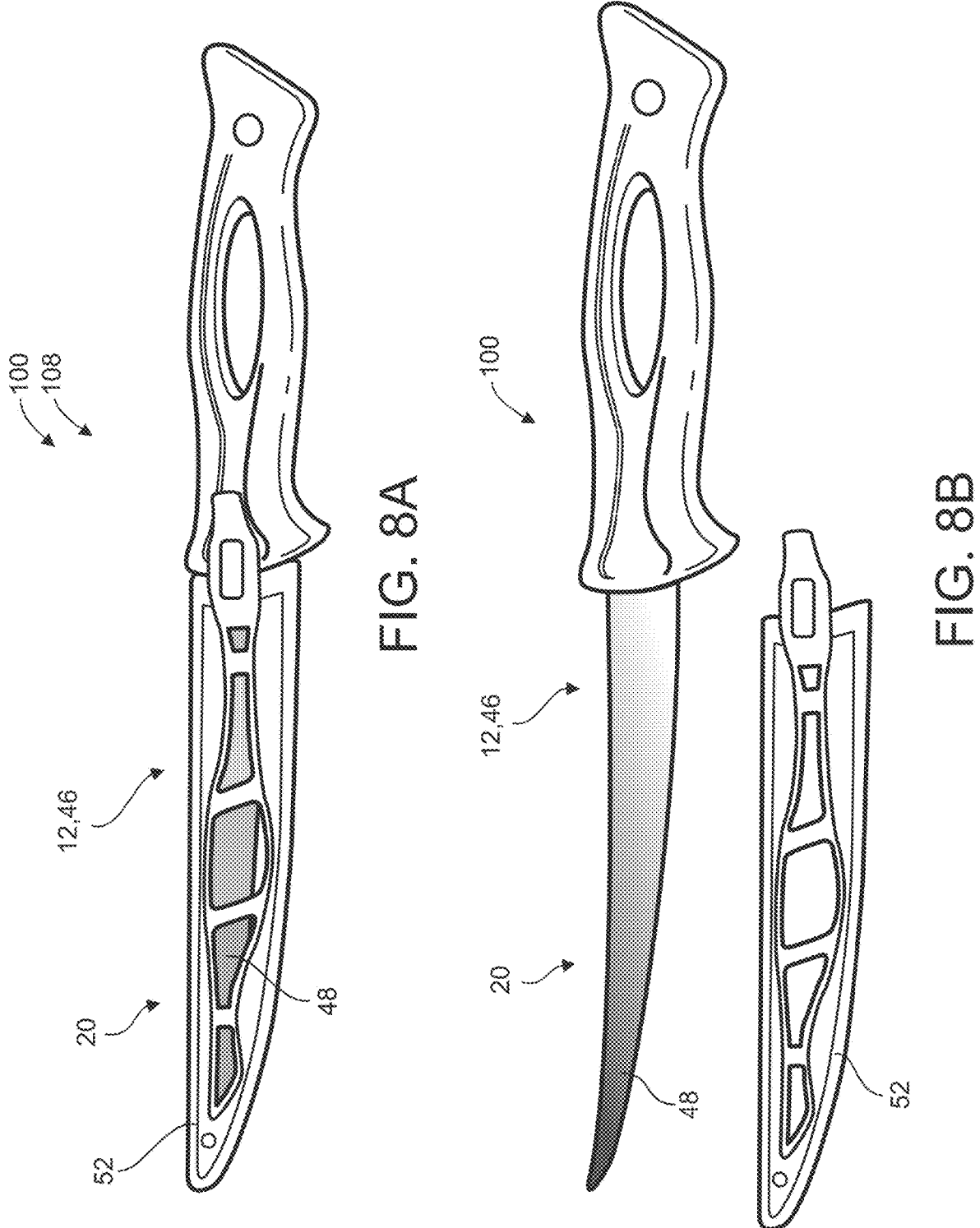
FIG. 8A is a perspective view of a knife stored in a knife sheath after being wicked in the disclosed containment device to house an oil wicking process to protect, clean, and/or lubricate any metallic item or tool.
FIG. 8B is a perspective view of the knife and knife sheath from FIG. 8A with the knife removed from the knife sheath showing the knife still free from dirt, dust and/or rust after being stored in the knife sheath after being wicked in the disclosed containment device to house an oil wicking process to protect, clean, and/or lubricate any metallic item or tool.

Referring now specifically to FIGS. 8A and 8B, knife 46 is shown with knife sheath 52. In FIG. 8A, knife 46 is shown stored in knife sheath 52 after being wicked in the disclosed containment device 10 to house oil wicking process 100. In FIG. 8B, knife 46 is shown removed from knife sheath 52 after being stored/transported therein, where working portion 20 of knife 46 is still clean and protected and free from any degradation or rust 35.

Figure 9:
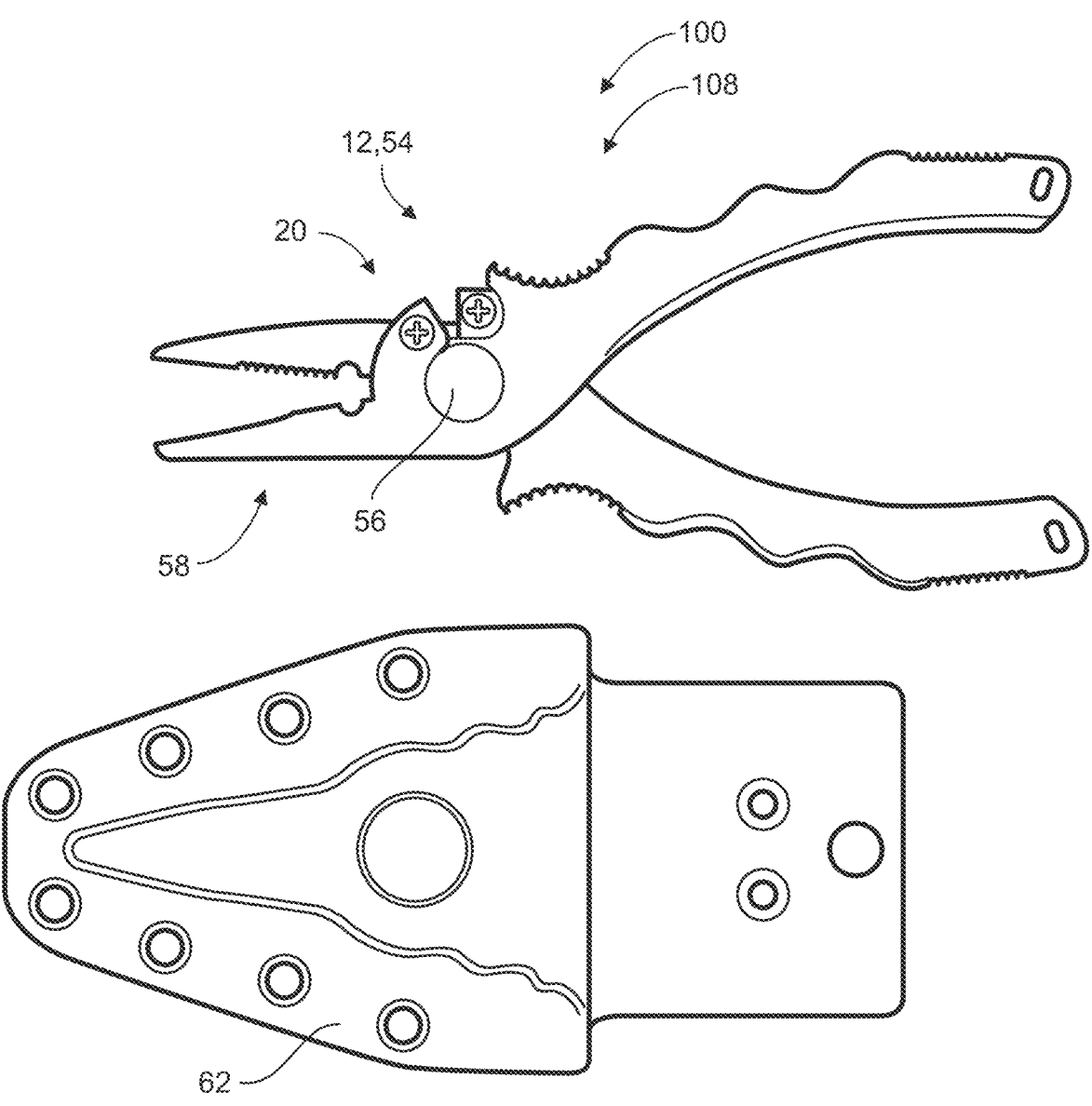
FIG. 9 is a perspective view of a pair of pliers and a pliers holder with the pair of pliers removed from the pliers holder showing the pair of pliers still free from dirt, dust and/or rust after being stored in the pliers holder after being wicked in the disclosed containment device to house an oil wicking process to protect, clean, and/or lubricate any metallic item or tool.

Referring now specifically to FIG. 9, pair of pliers 54 is shown with pliers holder 62. Pair of pliers 54 is shown after being stored in pliers holder 62 after being wicked in the disclosed containment device 10 to house oil wicking process 100. As shown, pair of pliers 54 is shown removed from pliers holder 62 after being stored/transported therein, where working portion 20 of pair of pliers 54 is still clean and protected and free from any degradation or rust 35.

Referring to FIGS. 1-9, in another aspect, the instant disclosure embraces oil wicking process 100 to protect, clean, and/or lubricate metallic item or tool 12. The disclosed oil wicking process 100 to protect, clean, and/or lubricate metallic item or tool 12 may generally include utilizing the disclosed containment device 10 to house oil wicking process 100 to protect, clean, and/or lubricate metallic item or tool 12 in any of the embodiments and/or combination of embodiments shown and/or described herein. As such, in select embodiments, oil wicking process 100 to protect, clean, and/or lubricate metallic item or tool 12 may generally include: step 102 of providing the disclosed containment device 10 to house oil wicking process 100 to protect, clean, and/or lubricate metallic item or tool 12 in any of the embodiments and/or combination of embodiments shown and/or described herein; step 104 of inserting working portion 20 of metallic item or tool 12 into one of the slots 18; and step 106 of submerging working portion 20 of metallic item or tool 12 into wicking oil 16 in containment housing 14. However, oil wicking process 100 is not so limited thereto, and may also include the step of inserting knife 46 into knife sheath 52 after removing knife 46 from wicking oil 16 in containment housing 14, like for storage and/or transportation of knife 46 (like as shown in FIG. 8. Or oil wicking process 100 may also include the step of inserting pair of pliers 54 into pliers holder 62 after removing pair of pliers 54 from wicking oil 16 in containment housing 14, like for storage and/or transportation of pair of pliers 54 (like as shown in FIG. 9).

In sum, the present disclosure may be directed to containment devise 10 to house oil wicking process or method 100 that will lubricate, protect and/or clean any metallic item or tool 12. As examples, containment device 10 to house oil wicking process or method 100 may be used for knife 46 in knife sheath 52 that will wick oil to blade 48 to stop any degradation before being stored/transported in knife sheath 52, or for pair of pliers 54 in pliers holder 62 that will lubricate pair of pliers 54 before being stored/transported in its case.

A feature of the present disclosure may be its ability to lubricate, protect and/or clean any metallic item or tool 12. As an example, and clearly not limited thereto, all knife sheaths are made without the advantage of applying a lubricant to the blade. So, when the knives are placed back in the sheath, they begin to rust and damage the blade. This is true for any tool or metallic item being stored. The instant disclosure may be designed to lubricate, protect, and/or clean such knives, or the like, to prevent rust or damage when it is placed back into the sheath or holder.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A containment device to house an oil wicking process to protect, clean, or lubricate a metallic item or tool, the containment device comprising:
   a containment housing including a top with a top surface thereon;
   a wicking oil inside of the containment housing;
   at least one slot in the top of the containment housing, each of the at least one slots is configured to receive a working portion of the metallic item or tool;
   each of the at least one slot including a flexible inner opening, the flexible inner opening is configured for engaging the metallic item or tool as it is being inserted into the slot and removed from said slot, wherein:
      the flexible inner opening is designed and configured to remove dirt and dust from the working portion of the metallic item or tool before it is inserted into the wicking oil in the containment housing;
      the flexible inner opening is configured to remove excess of the wicking oil from the working portion of the metallic item or tool after it is removed from the wicking oil in the containment housing; and
      the flexible inner opening of the slots is recessed below the top surface of the top for providing support around the metallic item or tool to keep the metallic item or tool positioned in said slot; and
   wherein, when the working portion of the metallic item or tool is inserted into one of the slots, the working portion of the metallic item or tool is submerged into the wicking oil.

2. The containment device of claim 1 wherein, when the working portion of the metallic item or tool is inserted into the slot and the working portion of the metallic item or tool is submerged into the wicking oil, the wicking oil is configured to lubricate, protect or clean the working portion of the metallic item or tool.

3. The containment device of claim 2 wherein, when the working portion of the metallic item or tool is inserted into one of the slots and the working portion of the metallic item or tool is submerged into the wicking oil, the wicking oil is configured to lubricate, protect and clean the working portion of the metallic item or tool.

4. The containment device of claim 1, wherein the containment housing including an open top side and a top, wherein the at least one slot is positioned in the top of the containment housing.

5. The containment device of claim 4, wherein the top is configured to be removably attached to the open top side of the containment housing, wherein the top may be removed from the containment housing for inserting or removing the wicking oil from the containment housing.

6. The containment device of claim 4, wherein the top is configured to be sealed to the open top side of the containment housing for sealing the open top side of the containment housing.

7. The containment device of claim 4, wherein the top includes:
   a submerged inner surface positioned below an upper edge surface of the open top side of the containment housing; and
   the at least one slot is positioned in the submerged inner surface of the top of the containment housing.

8. The containment device of claim 7, wherein the submerged inner surface being designed and configured to allow the containment housing to be partially filled with the wicking oil.

9. The containment device of claim 7, wherein the submerged inner surface being designed and configured to allow any spills or excess of the wicking oil to be captured on the submerged inner surface and drained back into the containment housing through the at least one slot.

10. The containment device of claim 4 further comprising a hinged lid, the hinged lid is configured for closing the open top side of the containment housing.

11. The containment device of claim 10 wherein the hinged lid including:

hinges;

latches on an opposing side of the hinges, the latches are configured for securely closing the open top side of the containment housing; and a handle configured for carrying and transporting the containment device.

12. The containment device of claim 1, wherein the flexible inner opening is a rubber flexible inner opening, a fabric material flexible inner opening, or a brush material flexible inner opening.

13. The containment device of claim 1, wherein the metallic item or tool is a knife where the working portion of the knife is a blade, where the at least one slot is a knife slot sized and configured to receive the blade of the knife into the wicking oil in the containment housing.

14. The containment device of claim 13, wherein when the knife is inserted into the containment device through the knife slot, the wicking oil is wicked to the blade to stop any degradation before being stored in a knife sheath.

15. The containment device of claim 1, wherein the metallic item or tool is a pair of pliers where the working portion of the pair of pliers is a pivot point and jaws, where the at least one slot is a pliers slot sized and configured to receive the pivot point and jaws of the pair of pliers into the wicking oil in the containment housing.

16. The containment device of claim 15, wherein when the pivot point and the jaws of the pair of pliers is inserted into the containment device through one of the pliers slot, the wicking oil is wicked onto the pivot point and the jaws of the pair of pliers to lubricate the pair of pliers before being stored in a holder.

17. The containment device of claim 1 comprising at least two of the slots, wherein:

at least one of the slots is a knife slot sized and configured to receive a blade of a knife into the wicking oil in the containment housing, wherein when the knife is inserted into the containment device through one of the knife slots, the wicking oil is wicked to the blade to stop any degradation; and at least one of slots is a pliers slot sized and configured to receive a pivot point and jaws of a pair of pliers into the wicking oil in the containment housing, wherein when the pivot point and jaws of the pair of pliers is inserted into the containment device through one of the pliers slots, oil is wicked to the pivot point and jaws of the pair of pliers to lubricate the pair of pliers before being stored in a holder.

18. The containment device of claim 17 comprising:

five or seven of the knife slots on a knife end portion of the containment housing; and four of the pliers slots on a pliers end portion of the containment housing.

19. A containment device to house an oil wicking process to protect, clean, or lubricate a metallic item or tool, the containment device comprising:

a containment housing including an open top side and a top;

a wicking oil inside of the containment housing;

wherein the top is configured to be removably attached to the open top side of the containment housing, wherein the top may be removed from the containment housing for inserting or removing the wicking oil from the containment housing;

wherein the top is configured to be sealed to the open top side of the containment housing for sealing the open top side of the containment housing;

at least one slot in the top of the containment housing, each of the at least one slots is configured to receive a working portion of the metallic item or tool;

the top including:

a submerged inner surface positioned below an upper edge surface of the open top side of the containment housing;

the at least one slot is positioned in the submerged inner surface of the top of the containment housing;

wherein the submerged inner surface being designed and configured to allow the containment housing to be partially filled with the wicking oil;

wherein the submerged inner surface being designed and configured to allow any spills or excess of the wicking oil to be captured on the submerged inner surface and drained back into the containment housing through the at least one slot;

wherein each of the at least one slots including a flexible inner opening, the flexible inner opening is configured for engaging the metallic item or tool as it is being inserted into one of the slots and removed from said slot, wherein the flexible inner opening is a rubber flexible inner opening, a fabric material flexible inner opening, or a brush material flexible inner opening, wherein:

the flexible inner opening is designed and configured to remove dirt and dust from the working portion of the metallic item or tool before it is inserted into the wicking oil in the containment housing;

the flexible inner opening is configured to remove the excess of the wicking oil from the working portion of the metallic item or tool after it is removed from the wicking oil in the containment housing; and the flexible inner opening of the slots is recessed below the submerged inner surface of the top for providing support around the metallic item or tool to keep the metallic item or tool positioned in one of the slots;

wherein, when the working portion of the metallic item or tool is inserted into one of the slots and the working portion of the metallic item or tool is submerged into the wicking oil, the wicking oil is configured to lubricate, protect and clean the working portion of the metallic item or tool;

wherein, when the metallic item or tool is a knife and the working portion of the knife is a blade, the at least one slot is configured as a knife slot sized and configured to receive the blade of the knife into the wicking oil in the containment housing, wherein when the knife is inserted into the containment device through one of the knife slots, the wicking oil is wicked to the blade to stop any degradation; and wherein, when the metallic item or tool is a pair of pliers and the working portion of the pair of pliers is a pivot point and jaws, the at least one slot is configured as a pliers slot sized and configured to receive the pivot point and jaws of the pair of pliers into the wicking oil in the containment housing, wherein when the pivot point and jaws of the pair of pliers is inserted into the containment device through one of the pliers slots, oil is wicked to the pivot point and jaws of the pair of pliers to lubricate the pair of pliers before being stored in a holder.

20. An oil wicking process to protect, clean, or lubricate a metallic item or tool comprising:

providing containment device to house the oil wicking process to protect, clean, or lubricate a metallic item or tool, the containment device comprising:

a containment housing including a top with a top surface thereon;

a wicking oil inside of the containment housing;

at least one slot in the top of the containment housing, each of the at least one slots is configured to receive a working portion of the metallic item or tool;

each of the at least one slot including a flexible inner opening, the flexible inner opening is configured for engaging the metallic item or tool as it is being inserted into the slot and removed from said slot, wherein:

the flexible inner opening is designed and configured to remove dirt and dust from the working portion of the metallic item or tool before it is inserted into the wicking oil in the containment housing;

the flexible inner opening is configured to remove excess of the wicking oil from the working portion of the metallic item or tool after it is removed from the wicking oil in the containment housing; and the flexible inner opening of the slots is recessed below the top surface of the top for providing support around the metallic item or tool to keep the metallic item or tool positioned in said slot;

inserting the working portion of the metallic item or tool into one of the slots; and submerging the working portion of the metallic item or tool into the wicking oil.

* * * * *